(12) United States Patent
Chevallier et al.

(10) Patent No.: US 8,634,708 B2
(45) Date of Patent: Jan. 21, 2014

(54) METHOD FOR CREATING A NEW SUMMARY OF AN AUDIOVISUAL DOCUMENT THAT ALREADY INCLUDES A SUMMARY AND REPORTS AND A RECEIVER THAT CAN IMPLEMENT SAID METHOD

(75) Inventors: Louis Chevallier, La Meziere (FR); Claire-Helene Demarty, Montreuil le Gast (FR); Lionel Oisel, La Nouaye (FR)

(73) Assignee: Thomson Licensing, Boulogne-Billancourt (FR)

(*) Notice: Subject to any disclaimer, the term of this patent is extended or adjusted under 35 U.S.C. 154(b) by 746 days.

(21) Appl. No.: 12/448,442

(22) PCT Filed: Dec. 20, 2007

(86) PCT No.: PCT/EP2007/064380
§ 371 (c)(1),
(2), (4) Date: Mar. 3, 2010

(87) PCT Pub. No.: WO2008/074877
PCT Pub. Date: Jun. 26, 2008

(65) Prior Publication Data
US 2010/0209072 A1 Aug. 19, 2010

(30) Foreign Application Priority Data
Dec. 21, 2006 (FR) ...................................... 06 55803

(51) Int. Cl.
| H04N 5/783 | (2006.01) |
| H04N 5/93 | (2006.01) |
| H04N 7/16 | (2011.01) |
| H04N 7/173 | (2011.01) |
| H04N 9/80 | (2006.01) |
| G06F 3/00 | (2006.01) |
| G06F 3/16 | (2006.01) |
| G10L 11/00 | (2006.01) |
| G10L 19/14 | (2006.01) |

(52) U.S. Cl.
USPC .......... 386/343; 386/241; 386/248; 386/278; 386/282; 704/211; 704/276; 715/719; 715/727; 725/89; 725/134; 725/142

(58) Field of Classification Search
USPC ........... 386/343, 241, 248, 278, 282, E5.001, 386/E7.071, E9.013, E9.036; 345/7; 704/211, 276; 707/E17.019; 715/49, 715/719, 727; 725/89, 134, 142
See application file for complete search history.

(56) References Cited

U.S. PATENT DOCUMENTS 7,406,409 B2 * 7/2008 Otsuka et al. ................. 704/211
7,483,618 B1 * 1/2009 Edwards et al. .............. 386/278

(Continued)

FOREIGN PATENT DOCUMENTS

| EP | 1262884 | 12/2002 |
| FR | 0213977 | 10/2002 |
| WO | WO2004040471 | 5/2004 |
| WO | WO 2005/062610 | 7/2005 |

OTHER PUBLICATIONS

Search Report Dated Mar. 6, 2008.

*Primary Examiner* — Thai Tran
*Assistant Examiner* — Syed Hasan
(74) *Attorney, Agent, or Firm* — Tutunjian & Bitetto, P.C.

(57) ABSTRACT

The invention relates to a method for creating a new roundup of an audiovisual document previously recorded in a device. The document contains two parts, one being the roundup and the other composed of a plurality of reports. The roundup is itself divided into a plurality of parts. The device first searches for the associations between the roundup parts and the reports, and detects the reports that are not associated with roundup parts. Then, summaries are created for the reports not associated with the roundup, and incorporated into the initial roundup to create a new roundup. In this manner, the user can easily select any report from the roundup part associated with this report. The invention also relates to the receiver suitable for implementing the method.

14 Claims, 4 Drawing Sheets

(56) References Cited

U.S. PATENT DOCUMENTS

Figure 1:
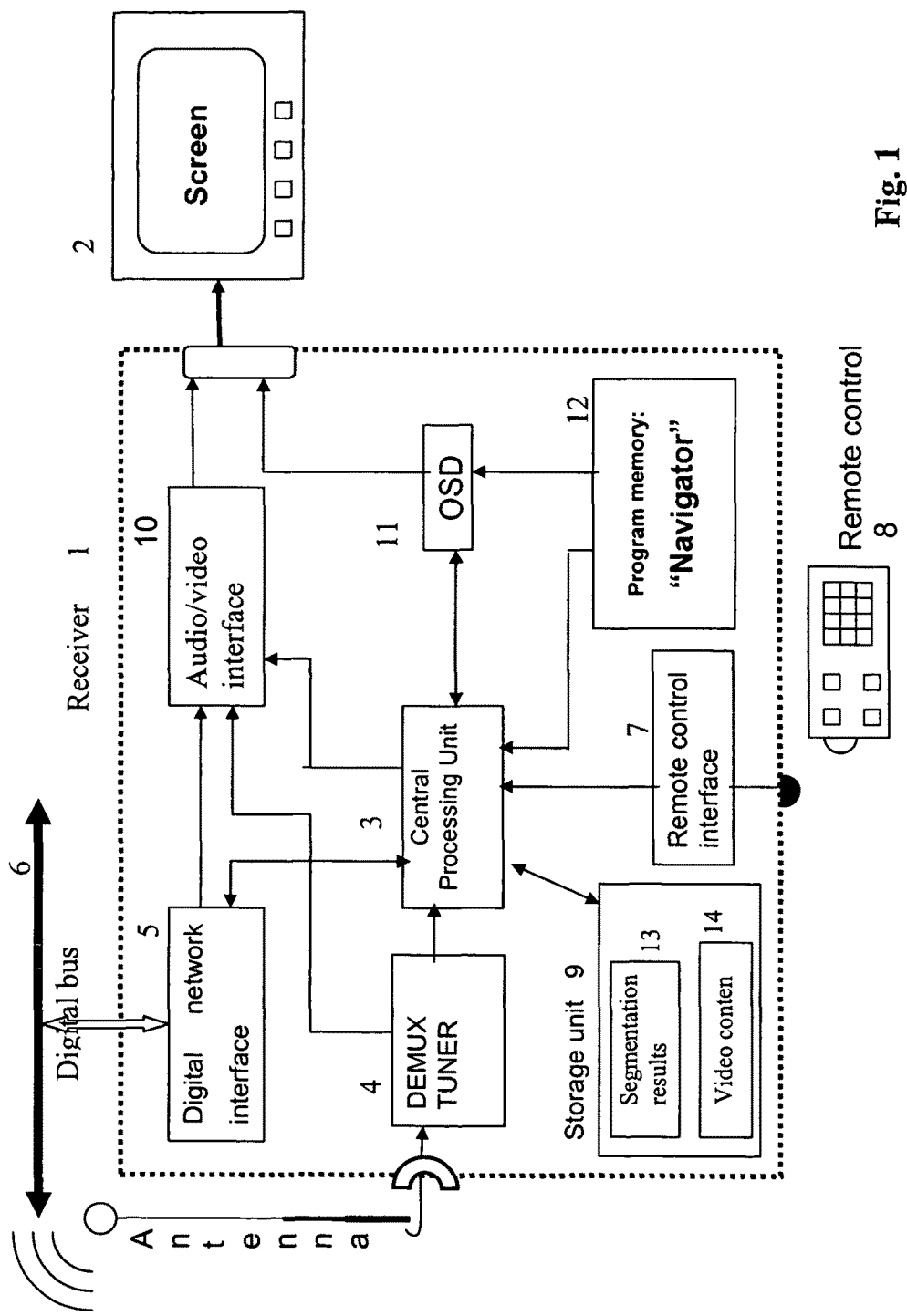

| | | |
|---|---|---|
| 7,756,386 B2 * | 7/2010 | Kizuki et al. ............ 386/241 |
| 2002/0199204 A1 | 12/2002 | Mory et al. |
| 2004/0181545 A1 | 9/2004 | Deng et al. |
| 2005/0193408 A1 | 9/2005 | Sull et al. |
| 2006/0107289 A1 | 5/2006 | DeYonker et al. |
| 2007/0101394 A1 * | 5/2007 | Fu et al. ............ 725/134 |
| 2008/0075431 A1 * | 3/2008 | Moriya et al. ............ 386/95 |

* cited by examiner

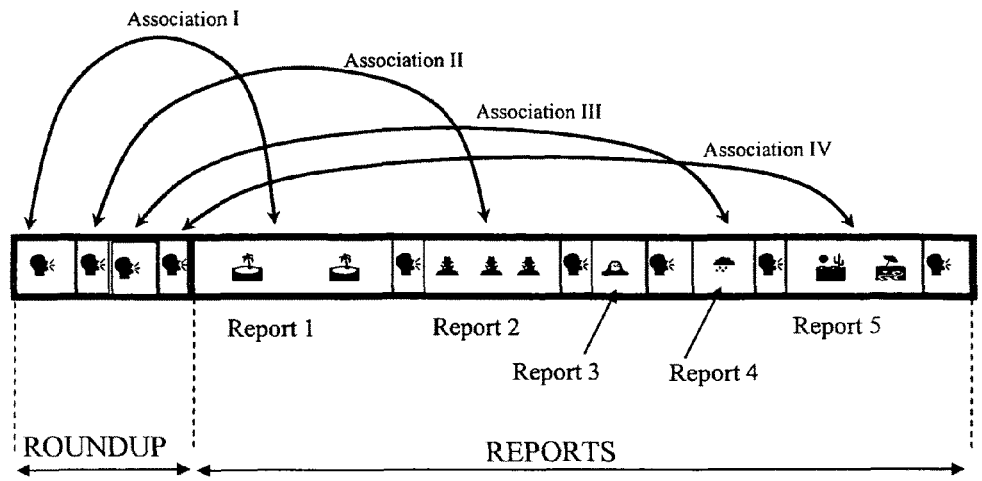
Fig. 3.a
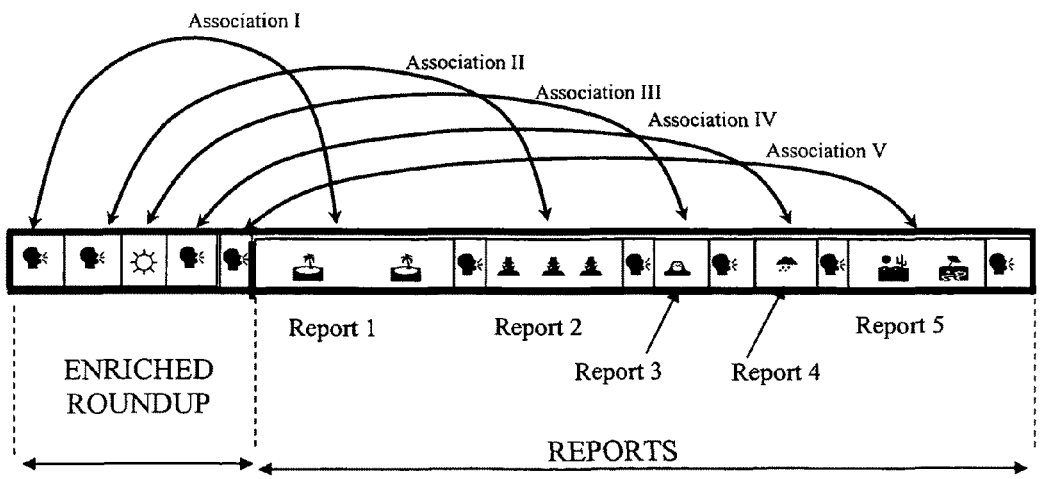
Fig. 3.b

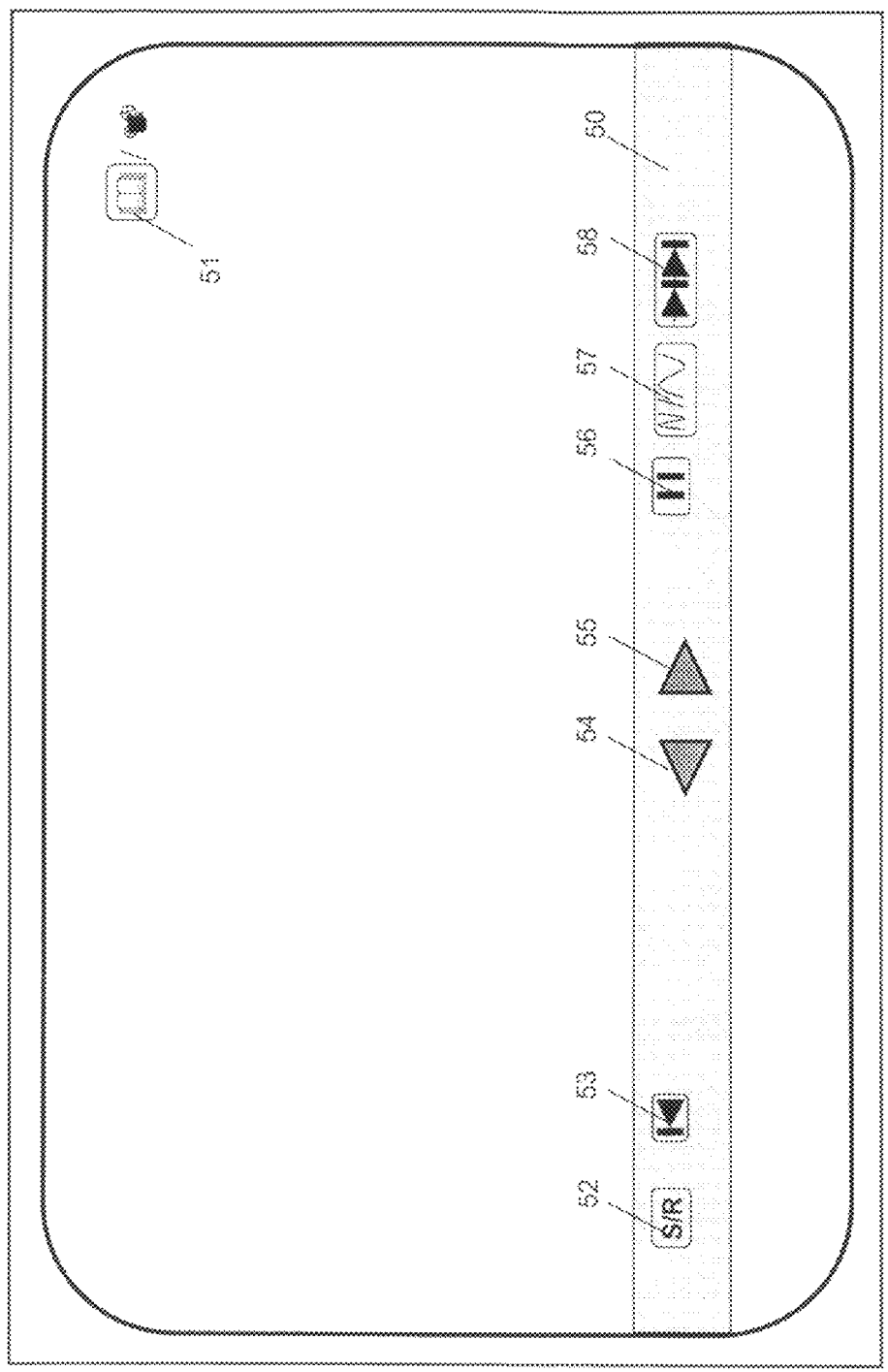

METHOD FOR CREATING A NEW SUMMARY OF AN AUDIOVISUAL DOCUMENT THAT ALREADY INCLUDES A SUMMARY AND REPORTS AND A RECEIVER THAT CAN IMPLEMENT SAID METHOD

This application claims the benefit, under 35 U.S.C. §365 of International Application PCT/EP2007/064380, filed Dec. 20, 2007 which was published in accordance with PCT Article 21(2) on Jun. 26, 2008 in French and which claims the benefit of French patent application No. 06/55803, filed Dec. 21, 2006.

The invention relates to a method for creating a new roundup of an audiovisual document comprising an initial roundup and reports, and a receiver implementing the method.

Nowadays, many devices can receive and reproduce recorded audiovisual works. Recently, large capacity hard disks have been integrated into these audiovisual receivers; it is thus possible to store content downloaded onto them either from a unidirectional broadcast network, or from a point to point network (Internet for example). Among these devices, the PVRs (acronym for Personal Video Recorder) are generally equipped with an Electronic Program Guide) abbreviated to EPG) that allow a user to display the content recorded in the hard disk and to reproduce them by means of a command. Today, the size of the hard disks allows more than 200 hours of programs to be stored. This quantity of available information requires new functionalities to be added to the PVRs enabling a rapid inter and intra navigation. The EPG can regroup the documents according to many criteria and present them in groups, for example: theme, type, language, parental control, etc. The classification is achieved by means of metadata associated with the audiovisual content. According to a variant, the receiver analyses the content and is capable of classifying it. Another example of storage means relates to the video cassette recorders that record audiovisual works on magnetic tapes, in this case the access to the audiovisual content is sequential. On these products, it is possible, either to immediately record the video being received on the current channel, or to program a future event. Whatever the manner of storing the content, the user interface can control the selection and playing of the works downloaded and recorded. Initially, the user selects the program that he wants to view by means of a program guide. Then, by pressing the "play" button, he triggers the viewing of the work.

In the case of digital recordings (for example: a DVD), the work is segmented into several chapters. In this manner, the user can choose a chapter and start viewing at the start of the selected chapter. By pressing the "Next track" button, the viewing skips to the next segment. Some programs received by a broadcast network are also segmented, to such that, once recorded on the hard disk of the receiver, the user can select a specific segment to view it or navigate from one segment to another by viewing only the first seconds to search for the required segment. If the program is received non-segmented, there are segmentation methods capable of segmenting it at the level of the receiver, the patent application referenced FRO2.13977 submitted in France on 28 Oct. 2002 describes a segmentation method that uses the audiovisual content of the work to extract the parts having a semantic unity from it. The method described in the request FR02.13977, can produce a segmentation of sports videos according to several levels. There are also methods capable of extracting in an automatic manner the tree structure of a film or a documentary video. Classically, the video is divided into shots by being based on sudden changes of the colour content of the pictures. Then, the shots are grouped into scenes by being based on the visual resemblance of the content of the shots and their temporal proximity. Generally, it is possible, for a large number of types of video documents, to define a tree structure having several levels.

The document US 2006/0107289 describes an audiovisual device receiving audiovisual programs and service data associated with these programs. The device has several data reception means coming from various networks: satellite, cable and terrestrial, and a storage means of the data received from the networks. The device displays an electronic program guide (EPG) that presents the various documents recorded. The documents are presented in the form of thumbnails which is the first video frame of the document. If the first picture is black, then another picture is sought. This document does not enable a roundup to be enriched by presenting the user with anything other than the title and the first picture of the document.

When the recorded document is a television news program, the indexing according to the current methods will enable direct access to the reports. The television news programs generally begin with a roundup during which the main reports composing this news program are presented. In the best of cases, the guide using the indexing method presents the roundup as a report and presents it as such to the user. Indeed, the pictures during the roundup show the presenter orally exposing the different reports, a non-effective indexing method will consider that all of the pictures constitute a unity. In other cases, the roundup is divided into several reports. In all the cases, the parts of the news program are shown separately and at the same level of presentation, which is not satisfactory as the user clearly sees that the news program is constituted by a certain number of reports without indicating whether they are real reports or parts of the roundup. Moreover, if reports are not presented in the roundup, the user has difficulties to find it easily. The present invention offers the user a particularly user-friendly interface for this type of document, by allowing an effective navigation between reports and roundup parts.

The purpose of the invention is a method for creating a new introductory roundup of an audiovisual document recorded in a device, characterized in that it comprises the following steps:

dividing the document into two parts, one being the roundup and the other composed of a plurality of reports, dividing the roundup into a plurality of parts, searching for associations between one roundup part and a report, and detection of at least one report not associated with a roundup part, creation of a summary for at least one report not associated with a roundup part, from at least one picture of an audiovisual sequence extracted from said report, integration of the summary thus created in the new roundup.

In this manner, the reports that were not shown in the roundup, become so in the new roundup so that the user can navigate in an to audiovisual document and pass from an introductory summary to any report contained in the document and associated with this summary. The division of the document into roundup parts and into reports enables the user to be offered two levels of information, a first enabling him to be informed of the subject of the report, the second being the report itself.

According to a first improvement, the integration of the summary thus created in the roundup is carried out by respecting the order of the reports. In this manner, the user can more easily follow the structure of the document. According to another improvement, the creation of a summary consists in extracting audiovisual sequences having a determined characteristic, for example, the presence of the outline of a presenter. In this manner, the sequences of the summary thus created have a more relevant information content.

According to one improvement, for a given report, the creation of an associated summary only occurs if the duration of this report is greater than a determined value. In this manner, the roundup is not cluttered by summaries associated with unimportant reports. According to one improvement, several reports are concatenated into a same sequence and this sequence is associated with a summary for which at least one part is created locally. In this manner, it is possible to limit the number of summaries by gathering several reports. According to one improvement, the concatenated reports have a particular characteristic such as: a duration less than a determined value, or a particular theme. As a result, the grouping of several reports to produce a unique associated summary has meaning for the user.

According to one improvement, during the navigation, the device displays a visual indication during the viewing of the roundup parts created by the device. In this manner, the user knows that this summary was not in the initial document but was created by his device.

The present invention also relates to an audiovisual receiver comprising a central processing unit, a reproduction means of parts at least of an audiovisual document recorded in a storage means of said document, a reception means of selection commands, said document comprising a roundup divided into a plurality of parts and a plurality of reports, characterized in that it comprises a means for associating each part of the roundup with a report, a means for creating a summary of at least one report not associated with a roundup part, the summary being constituted by at least one picture of an audiovisual sequence extracted from this report, the means for storing integrating the summary thus created in a new roundup of the document, the introduction of a selection command activated on a roundup part thus created triggering the reproduction of the corresponding report.

Figure 2:
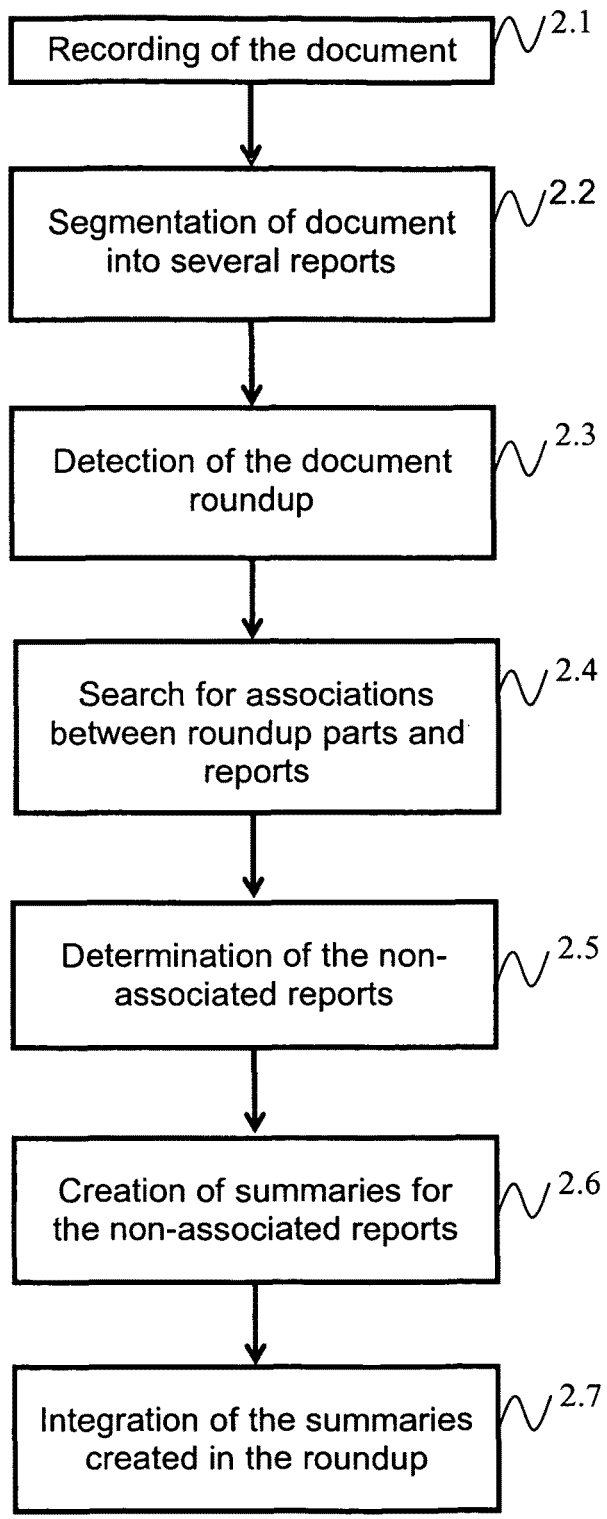

Other characteristics and advantages of the invention will now emerge with more details, within the scope of the description that follows, of embodiments given as an example by referring to the figures attached wherein:

FIG. 1 is a block diagram of an audiovisual receiver for the implementation of the invention, FIG. 2 is a flowchart of the main steps carried out by the navigator, FIGS. 3.a and 3.b are illustrations of the division of a document recorded before and after the creation of the new summary, FIG. 4 is a screen appearance enabling the navigation in the previously segmented and divided document.

A description will first be given of the operation of an audiovisual receiver 1 equipped with a display device 2. The receiver comprises a central processing unit 3 connected to the program memory 12, and an interface 5 for the communication with a high bit-rate local digital bus 6 enabling audio/video data to be transmitted in real time. This network is for example an IEEE 1394 network. The receiver can also receive audio/video data from a broadcast network through a receiver antenna associated with a demodulator 4. The receiver further comprises an infrared signal receiver 7 to receive the signals of a remote control 8, a memory 9 for the storage of downloaded data, and an audio/video decoding logic 10 for the generation of audiovisual signals sent to the television screen 2. According to one embodiment, the memory 9 is a hard disk of large capacity enabling audiovisual documents to be recorded. According to another embodiment, the audiovisual document is contained in a removable support such as a compact disk or a DVD disk, the support being inserted into a reader peripheral device (not shown in FIG. 1) incorporated into the receiver. The remote control has direction buttons ↑, ↓, → and ← and at least one button: "OK". According to a preferred embodiment, the direction arrows enable a cursor to be moved around the screen, the commands accessible to the user are shown in the form of icons and are activated when the user presses on "OK" with the cursor positioned on the icon corresponding to the required command.

The receiver also comprises a display circuit 11 of data on the screen, often called OSD circuit, "On Screen Display". The OSD circuit 11 is a text and graphics generator that enables the on screen display of menus, pictograms (for example, a number corresponding to the channel displayed) and that can display the navigating menus in accordance with the present invention. The OSD circuit is controlled by the Central Processing Unit 3 and a navigator 12. The navigator 12 is advantageously realized in the form of a program module recorded in a read-only memory. It can also be realized in the form of an ASIC type specialized circuit for example.

The digital bus 6 and/or the broadcast network transmit data comprising audiovisual documents to the network. Possibly, these documents are associated with descriptive data. This data comes either from a broadcast network, or from the digital network 6. The descriptive data notably comprise segmentation information defining the different segments of the document. Advantageously, the descriptive data enables a fine breakdown of the document and comprises text enabling at least one title to be given to each segment. The descriptive data is for example contained in the service information specified by the DVB-SI standard, it is recorded in the memory 9 of the receiver. The navigator extracts it to manage the navigation.

After presenting the main elements, an explanation of how they cooperate will now be given. FIG. 2 presents a flowchart of the main steps according to an embodiment of the invention. Initially (step 2.1), the document is downloaded from the digital network 6 or the broadcast network and recorded in memory 9. At one moment or another, the user indicates that this document comprises a roundup and a set of reports. Typically, this document is a television news program, it can also be a documentary, a game composed of several trials or, in a general manner, any video or audio document comprising a plurality of sequences presented in a roundup included in the document. The fact of marking the document triggers the execution of a program designed to analyze the document and enrich its roundup.

If the document is not received with its segmentation data, the program determines it locally by means of a software segmentation module that locates, in the document, the reports and roundup parts that present these reports.

In step 2.2, the document is segmented into a plurality of report sequences. Many methods of the literature propose solutions to this problem. For example, a possible technique consists, following a division into shots of the video, in identifying the recurrent shots showing a determined picture, typically the presenter of the television news program. The different shots present between the two appearances of the presenter are grouped within a same video segment characterizing a report. In another example, the video sequence is divided into shots, then, the shots are grouped into scenes by being based on the visual resemblance of the content of the shots and their temporal proximity. The audio component can be observed by analyzing the acoustic environment (a report on a football match, or on an ecology documentary, or on the last intervention of a politician have different characteristics), or the continuity of the voice of a same reporter commenting his report. The different shots present between the two appearances of the presenter are grouped within a same video segment characterizing a report. At the output of this module, a list of reports as well as a list of shots containing the presenter is therefore obtained.

Typically, the visual similarity between segments is evaluated by representing each segment by a small set of "key pictures" extracted from the segment, and by evaluating a perceptual distance between visual attributes of these pictures. The attributes used can be for example distributions of dominant colors or gradient distributions. Following this first processing, the new program is segmented into reports, of which one is the roundup.

During step 2.3, the program locates the roundup in the document and divides it into parts presenting a visual identity. One hypothesis consists in considering that the roundup is found at the beginning of the television news program (it is also possible to consider the other hypothesis in which the roundup is rebroadcast at the end of the news program in order to recall the main headings). The search for the pictures of the roundup can be carried out according to different hypotheses, for example:

the pictures of the roundup contain rectangular thumbnails generally positioned at the top left or bottom right of the presenter, the roundup is broadcast at the start of the news program before the appearance of the presenter in the form of a succession of video clips.

There are other visual recognition techniques. For example, a selection of all the shots preceding the first report is first carried out. For all of these shots, a detection of thumbnails is implemented for all the pictures of each shot. This detection can be based on the fact that the thumbnails appear in a part of the picture, the rest of the picture remaining almost fixed. It is possible to use for example an algorithm based on the use of pictures resulting from the difference between successive pictures associated with a detection of a rectangular form by mathematical morphology.

If the roundup is present at the start of the document and that the pictures of reports do not appear in insert in the picture but in full screen, it is possible to use a detection method being based on the fact that:

the presenter gives the spoken summary accompanying the roundup. This can allow a speaker segmentation to be used then the pictures selected in which the presenter is speaking but is not visible, the roundup is generally comprised between the credits and the first appearance of the presenter. In this case, the detection of the credits being based on a detection of the tracks of music or on a prior knowledge of the credits enables the roundup to be found as being everything that is not credits.

According to an operating variant, the order of execution of the steps 2.2 and 2.3 is reversed. At the start of the analysis of the recorded document, the receiver first searches for the similarities between the pictures of the recorded document. For this, the document is divided into sequence shots, a sequence shot presenting a visual continuity. The sequence shots are then compared with each other to calculate a level of similarity. If this level exceeds a determined threshold, the images or sequence shot analyzed are associated two by two. The comparison also covers pictures as well as parts of pictures. Indeed, a news program can present the roundup with the presenter in the foreground, and certain pictures of the corresponding report in an insert. The comparison module detects in the picture present on the screen the existence of an insert comprising a small picture and carries out the comparison using this picture.

Following this first evaluation step of the similarities, the receiver analyses the distribution of the sequence shots presenting sequence shots marked by a similarity with another sequence shot. The receiver determines a group of at least one sequence shot having the highest concentration of similarities with other sequence shots of the document. If this group is not located at the start or the end of the recorded document, which are the normal places for the roundup, the method cannot be applied. In the contrary case, all the sequence shots that compose the group indeed constitute a roundup, the rest of the document being considered as the set of reports. This method can notably be applied if the presenter is not present in the pictures of the roundup, and if the pictures of the roundup do not comprise any particular characteristic.

Once the reports and the roundup are detected, the step 2.4 can detect the similarities existing between each portion of the roundup and each report. A method consists in comparing the pictures of the roundup with the pictures of the reports. Classic techniques of extracting attributes characteristic of the picture associated with a measure of distance enable a measurement of similarity to be provided allowing the association of the roundup and reports pictures to be traced back. In many cases, it can be considered that the roundup is constituted by video summaries of the associated reports, the invention can advantageously use the temporal component to make the picture matching process more robust. For example, the order of presentation of the reports in the roundup is generally the same as the one of reports of the news program. The measurement of similarity is thus increased if the two pictures presenting similarities are presented in the same order, some pictures being in the roundup, the others in the reports.

The document is now segmented, the associations between the roundup parts and the reports are realized. During step 2.5, the program tests whether each report is presented in the roundup. For this, an index table of the document is created in memory 9 enabling each element of the document to be indexed, here is an example of a table corresponding to the document for which the chronology of the content is illustrated in FIG. 3.a.

|  | Report number | | | | |
| --- | --- | --- | --- | --- | --- |
|  | 1 | 2 | 3 | 4 | 5 |
| Report index | 1'05" | 5'23" | 7'18" | 11'04" | 13'25" |
| Index in the roundup | 0'0" | 0'15" | — | 0'30" | 0'48" |

In the example above, the report number 3 is not presented in the roundup. At the end of step 2.5, the program identified all the reports that are not associated with a roundup part.

In step 2.6, the program automatically produces a summary, preferably short, for the reports not associated with a part of the current roundup. To do this, the program selects a certain number of extracts of the report (video segments or key pictures) that are concatenated into an audiovisual or video sequence. According to a preferred embodiment, the selection of report extracts is carried out by taking a few seconds of each shot of the report. The duration of a few seconds varies by analyzing the visual and/or audio content of the report shot. For example, the shot must contain the presence of faces, or comprise video segments of least movement, etc. Another manner of acting consists in taking only the sequence shots of the report comprising the outline of the presenter. Another manner of acting consists in taking only the sequence shots of the report having a strong sound power, this improvement is notably useful to summarize sports reports.

In step 2.7, the program modifies the initial roundup by adding to it the automatically created summaries. Advantageously, the video content of these summaries is marked by an icon notifying the user in this way that these parts have been locally added to the recorded document. In a simple manner, the addition of the created summaries can be carried out at the end of the current roundup. A variant consisting in adding the roundup parts thus created in the order of appearance of the reports within the document. If the roundup parts were not already in the same order as the reports, the created summary for a given report is placed after the roundup part corresponding to the previous report in the document. At the end of the step 2.7, all the automatic summaries are inserted in the roundup, itself in the document. The index table of the document associates a roundup part for each report, here is an example of a table corresponding to the document for which the chronology of the content is illustrated in FIG. 3.*b*.

|  | Report number | | | | |
| --- | --- | --- | --- | --- | --- |
|  | 1 | 2 | 3 | 4 | 5 |
| Report index | 1'25" | 5'43" | 7'38" | 11'24" | 13'45" |
| Index in the roundup | 0'0" | 0'15" | 0'30" | 0'50" | 1'08" |

It is seen in the table that a summary of a time of 20 seconds is created for the report 3, therefore the following parts of the summary and the reports are shifted by this time. Overall, the duration of the recorded document is increased by the total duration of the summaries created by the program.

FIG. 3.*a* illustrates the division of a document and the determination of the similarities between the roundup parts and the reports. Following steps 2.2 and 2.3, the program determined that the audiovisual document comprises a roundup having four parts, followed by five reports. By analyzing the similarities between the roundup parts and the reports during the step 2.4, the program was able to set up four associations between the roundup parts and the reports: the first part of the roundup and the first report, the second part of the roundup and the second report, the third part of the roundup and the fourth report and the fourth part of the roundup with the fifth report. The program determined during the step 2.5 that the third report is not presented in the roundup. According to the procedure described above, the program automatically produces a summary of the third report during the step 2.6. Following this creation and its incorporation in the roundup in step 2.7, FIG. 3.*b* illustrates the division of the document with five summary parts, each one being associated with one of the five reports.

According to one improvement, for a given report, the creation of an associated summary only occurs if the duration of said report is greater than a determined duration. Indeed, a news program generally contains reports of trivial news items that are related in a very short time. Therefore, the creation of an even shorter summary has hardly any sense, moreover it can be considered that the importance of these reports does not justify their introduction in the roundup. In such a manner that, for a report of a duration less than a given value, typically 15 seconds, the program does not create a summary. According to one improvement, the reports of short duration are linked and concatenated one after the other. In this manner, even if these reports are disseminated within the document between reports having a longer duration, they could be selected and viewed one after the other by the same command. All the short reports are associated with a screen page, displaying for example a generic text such as "in brief". The user by activating this page triggers the viewing of all the short reports.

The criterion for selecting reports of a short duration to associate them with a given summary is only given as an example. It is also possible to determine the theme of reports not referenced in the roundup and to regroup reports of a same theme, sport for example, by associating them with a same roundup part. This roundup part can already exist in the original document, the program adds a video sequence displaying for example the name of the theme.

The user can now navigate in the document and move easily from a roundup part to the associated report and vice versa. The user interface enables this navigation within the document. FIG. 4 shows a screen appearance for the navigation within a previously segmented video document and whose navigation links between the reports and the roundup parts have been established.

FIG. 4 shows an example of a screen during the viewing of a recorded video document. The video content appears in a background and a command banner 50 at the bottom of the screen. An icon 51 in the form of a book 📖 appears to indicate that the video content displayed is extracted from the roundup, an icon in the form of a camera: 📷 Appears to indicate that the video content is extracted from the report part of the news program. The banner contains the following command icons, proposed to the user:

Corresponding roundup/report exchange (52).
Back to the start of the roundup or reports (53).
Skip to the roundup extract or the previous report (54).
Skip to the roundup extract or the next report (55).
Freeze frame (56).
Viewing at normal/slow motion speed (57).
Continuous/report by report mode (58).

The first command 52 enables, by viewing a roundup extract, the corresponding report to be viewed. By default, it is the roundup that is viewed. If he does not introduce any command, the user can rapidly know the subject of the main reports comprising the news program.

The command 58 enables the report or the roundup extract to be viewed and to start or not to start viewing the roundup. By default, this is the continuous mode: when the user has enabled the command 52 to view the corresponding report, this report as well as the following ones are viewed up to the end of the news program. If the user enables the report/report mode, then when the report whose viewing was triggered by the activation of the is icon 52 has finished, the viewing of the roundup continues by viewing the next part of the roundup.

By means of this interface, the user can navigate from one extract to another by skipping from roundup parts to the corresponding report if the subject interests him. The method does not therefore need to process the pictures to modify their appearance or to create other pictures from the ones received, in this manner the device does not use a large computation power.

While the present invention was described in reference to particular illustrated embodiments, said invention is in no way limited to these embodiments, but only by the appended claims. It will be noted that changes or modifications can be made by those skilled in the art.

The invention claimed is:

1. A method for creating a new introductory roundup of an audiovisual document recorded in a device, the method comprising the steps of:
   dividing the audiovisual document into two parts, one being a prior roundup of the audiovisual document recorded in the device, and the other being composed of a plurality of reports, said dividing being performed within the device;
   dividing the prior roundup into a plurality of parts,
   searching for associations between one part of the prior roundup and a report,
   detecting at least one report not associated with a prior roundup part,
   creating a summary for the detected at least one report not associated with the prior roundup part, from at least one picture of an audiovisual sequence extracted from said report, and
   integrating the created summary into the new introductory roundup of the audiovisual document.

2. The method according to claim 1, wherein said integrating is performed by respecting the order of the reports.

3. The method according to claim 1, wherein said creating further comprises extracting at least one picture of an audiovisual sequence having a determined characteristic, such as the presence of the outline of a presenter.

4. The method according to claim 1, wherein for a given report, the creating of an associated summary only occurs if the duration of said report is greater than a determined duration.

5. The method according to claim 1, further comprising concatenating of several reports into a same sequence, this sequence being associated with a summary for which at least one part is created locally.

6. The method according to claim 5, wherein the concatenated reports have a particular characteristic such as a duration less than a determined value, or a particular theme.

7. The method according to claim 1, further comprising displaying a visual indication during the viewing of a roundup part indicating that this roundup part was created locally.

8. Audiovisual receiver having a central processing unit, a reproduction means of parts at least of an audiovisual document recorded in a storage device of said document, a reception means of selection commands, said audiovisual document comprising a prior roundup divided into a plurality of parts and a plurality of reports, characterized in that it comprises
   means for associating each part of the prior roundup with a report,
   means for creating a summary of at least one report not associated with any part of the prior roundup, the summary being constituted by at least one picture of an audiovisual sequence extracted from this report,
   means for storing the created summary in a new roundup of the audiovisual document,
   wherein an introduction of a selection command activated on a roundup part of the new roundup triggers the reproduction of the corresponding report.

9. The audiovisual receiver according to claim 8, wherein the storage means integrates the summary of the report in the new roundup while respecting the order of the reports.

10. The audiovisual receiver according to claim 8 wherein the means for creating a summary of a report not associated with any part of the prior roundup consists in extracting at least one picture of an audiovisual sequence, said picture having a determined characteristic, such as the presence of the outline of a presenter.

11. The audiovisual receiver according to claim 8, wherein for a given report, the creation of an associated summary only occurs if the duration of said report is greater than a determined duration.

12. The audiovisual receiver according to claim 8, wherein the storage means integrates a summary associated with several reports, and wherein the introduction of a selection command activating the reproduction of said several reports.

13. The audiovisual receiver according to claim 12, wherein the reports associated with a single summary have a particular characteristic such as a duration less than a determined value, or a particular theme.

14. The audiovisual receiver according to claim 8, further comprising a display means displaying a part of the new roundup and a visual indication indicating that this new roundup part was created locally.

* * * * *